Nov. 20, 1951  W. F. BENNING  2,575,379
CONTROL LEVER MOUNTED ON THREADED PIVOT
Filed Nov. 24, 1944
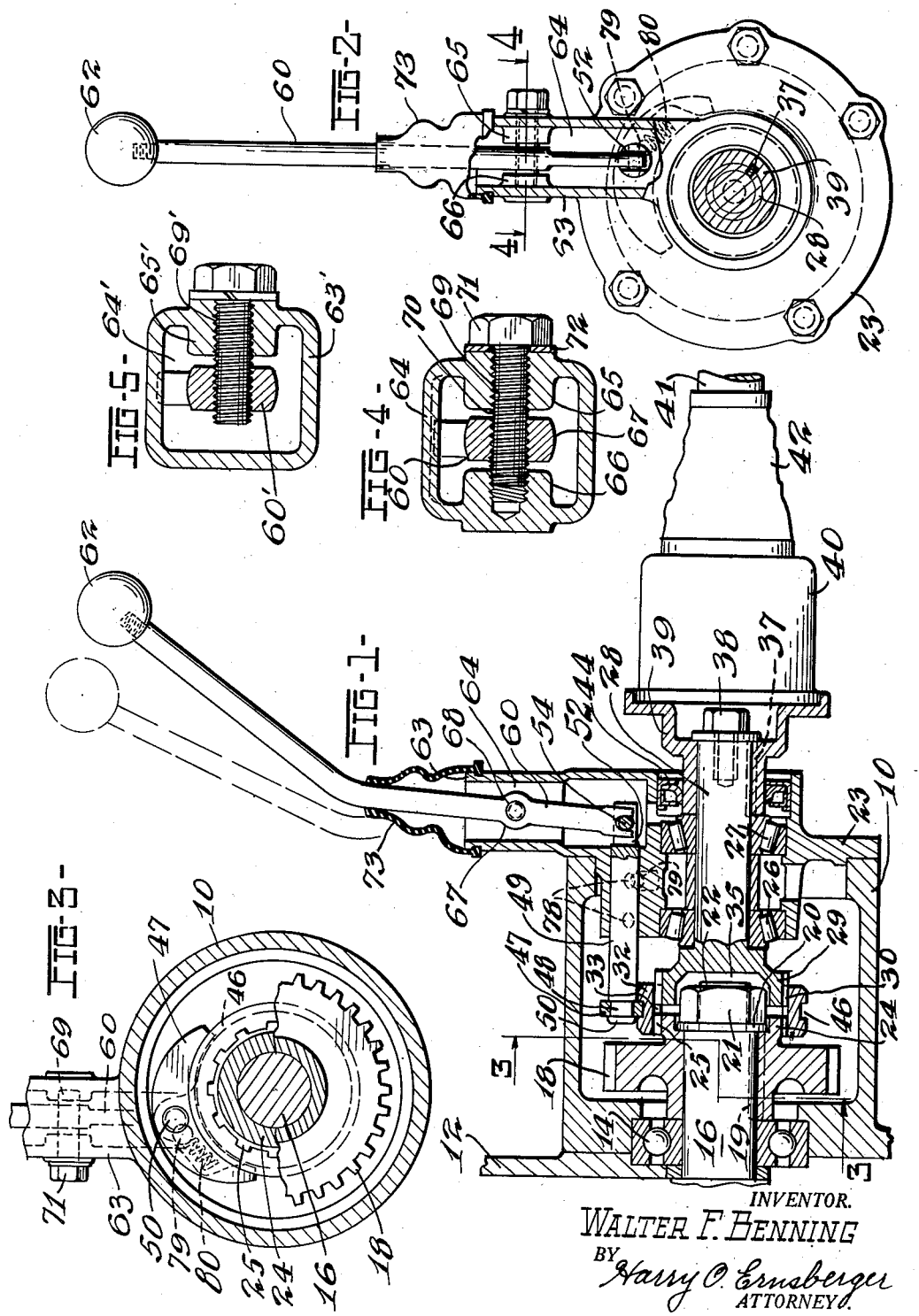
INVENTOR.
WALTER F. BENNING
BY Harry O. Ernsberger
ATTORNEY.

Patented Nov. 20, 1951

2,575,379

UNITED STATES PATENT OFFICE 2,575,379

CONTROL LEVER MOUNTED ON THREADED PIVOT

Walter F. Benning, Toledo, Ohio, assignor to Willys-Overland Motors, Inc., Toledo, Ohio, a corporation of Delaware Application November 24, 1944, Serial No. 564,985

3 Claims. (Cl. 192—519)

1

This invention relates to mechanism control and more especially to a lever control means and mounting therefor.

The invention comprehends the provision of a control means for mechanism, the control embodying a lever construction and mounting therefor of a character that is inexpensive to manufacture, but one which is simple and positive in its operation.

An object of the invention resides in a control lever mounting construction wherein machining operations of the parts are reduced to a minimum and wherein the mounting per se eliminates the use of anti-rattle springs, devices or the like.

Another object of the invention resides in the provision of a control lever and mounting in which the lever and its supporting fulcrum may be quickly assembled without the use of special tools and wherein an accurate fit of the lever control with its support is rendered unnecessary.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a vertical sectional view through a clutch mechanism and illustrating the mechanism control of my invention;

Figure 2 is an end elevational view of the construction shown in Figure 1 certain parts being broken away for purposes of illustration.

Figure 3 is a vertical sectional view taken substantially on the line 3—3 of Figure 1;

Figure 4 is an enlarged horizontal sectional view taken substantially on the line 4—4 of Figure 2 illustrating in detail the control lever mounting of my invention.

Figure 5 is a view similar to Figure 4 showing a modified construction of lever mounting.

While I have illustrated the arrangement of my invention as utilized in controlling the operation of a dental or toothed clutch mechanism, it is to be understood that I contemplate the embodiment of my invention with any type of mechanism wherein the control means may be found to have utility.

Referring to the drawings in detail, the housing 10 encloses transmission mechanism or gearing of a character having utility for transferring

2 power for driving both front and rear wheels of a vehicle (not shown). The housing 10 is connected to a second casing or housing 12 containing other elements of power transmission mechanism (not shown). Journaled in anti-friction bearings 14 supported in housing 10 is a shaft 16 projecting into housing 10 and which is driven from mechanism (not shown) contained within the casing 12. The extremity of shaft 16 carries a gear 18 arranged to be driven by said shaft through a key 19, the gear being held on the shaft by means of a washer 20 and a nut 21, the latter threaded upon a tenon 22 formed integrally upon the end of shaft 16. The gear 18 is in operative enmeshment with other gearing (not shown) for transmitting power to vehicle wheels. Integrally formed with the gear 18 is a rearwardly projecting portion 24 provided with a series of clutch teeth 25. The rear portion of housing 10 is provided with a closure or cover 23. Journaled in the housing 10 upon anti-friction bearings 26 and 27 of the tapered roller type is a driven shaft 28 having a forwardly projecting enlarged portion 29 formed with clutch teeth 30, the diameter of portions 24 and 29 being substantially identical so as to accommodate a shiftable clutch member 32, the latter provided internally with teeth 33 for establishing an operative driving connection between the gear 18 and the driven shaft 28. The enlarged portion 29 of shaft 28 is axially recessed as at 35 to accommodate the tenon 22 and nut 21 associated with shaft 16. Secured to the rear end of shaft 28 by means of a key 37 and a bolt 38 is an element 39 which is secured to and adapted to drive casing 40 forming part of a universal joint mechanism contained therein (not shown). The universal joint mechanism is connected to and adapted to transmit power to a shaft 41 for operating power take-off means or for any other purposes for which power may be utilized. A flexible boot or closure 42 connects the housing 40 with shaft 41 in order to prevent the ingress of dirt and foreign matter into the universal joint construction contained within the housing 40. An oil seal 44 surrounds the member 39 so as to prevent the escape of lubricant from the housing 10.

By shifting the dental clutch element 32 axially of shafts 16 and 28, engagement or disengagement of element 32 with gear 18 and shaft 28 may be obtained. In order to effect axial movement of clutch member 32, the latter is provided with a peripheral groove 46 into which extends a crescent shaped member 47 mounted upon a tenon portion 48 formed upon a slidably supported rod 49. The crescent-shaped member 47 is retained upon the tenon 48 by means of the swaged portion 50. The other end portion of the rod 49 is provided with a slot or kerf 52, the tines formed by the kerf being bored to receive a pin or stub shaft 54.

A controlling means for longitudinally shifting the rod 49 is provided and is inclusive of a clutch shifting control means or lever 60 provided at its lower end with a bifurcated configuration astraddle the pin 54, the upper end of the lever 60 being provided with a manipulating knob 62.

The cover 23 enclosing the rear of housing 10 is formed with an upwardly extending portion 63 of hollow configuration forming a chamber 64 within which is disposed the lower part of the lever 60. A fulcrum means for the lever is provided, being of simple yet effective construction. The opposed walls of the portion 64 are integrally formed with inwardly extending boss portions 65 and 66, the boss portion 65 being bored and threaded throughout its width, while boss 66 is bored and threaded only part way through as shown in Figure 4. The lever 60 is formed with an enlarged portion 67 which is also bored and threaded or formed with a helical groove 68. The fulcrum for the mechanism control member 60 is in the form of a member 69 having a helical rib or thread 70, member 69 having a head portion 71 abutting a locking means 72, that shown being in the form of a lock washer, which in turn engages the exterior surface of boss 65, the latter forming a stop means for predetermining the assembled position of the member 69. In the embodiment of the invention illustrated in Figure 4, the member 69 extends entirely through the boss 65, the threaded opening in control member 60 and into the threaded portion of boss 66. It should be noted from examination of Figure 4 that the member 60 is spaced from the interior faces of bosses 65 and 66 and is retained substantially in this relation to the said bosses by reason of its being threadedly supported upon the member 69. In this construction, the control member 60 may be oscillated through an angular distance of several degrees, an amount sufficient to shift the clutch member 32 into and out of engagement with the driving member 24. The lateral movement of member 60 due to its being supported on a threaded member with respect to the bosses 65 and 66 is very slight, being only equal to the pitch of the thread on member 69 through the degree of maximum angular movement of control member 60. This arrangement has many advantageous features in that the interior faces of bosses 65 and 66 do not require machining, and do not have to be maintained to any high degree of accuracy. The same is true with respect to the exterior faces of portion 67 of the control member or lever 60, as they do not engage the bosses 65 and 66 during normal angular movements of lever 60 to actuate the clutch 32 or other mechanism with which the lever may be utilized. A closure boot 73 engages the upper exterior periphery of portion 64 of cover 23 and also snugly fits the member 60 as particularly shown in Figure 1 to prevent the ingress of dirt or foreign matter into the chamber defined by portion 64.

The slidable rod 49 may be held in clutch engaged or disengaged positions by any suitable means. In the embodiment illustrated the bar is formed with spaced recesses or indentations 78 which are adapted for selective engagement with a ball-shaped detent 79, which is urged into engagement with a rod 49 under the influence of a coil spring 80. By this means, the rod 49 is resiliently held in selected position and slight pressure applied to the control member results in the spring 80 being compressed and the detent 79 riding out of recess 78 to accomplish a clutch shifting operation.

A modification of control lever mounting is illustrated in Figure 5 in which the projecting portion 63' is provided with a single boss 65', which is bored and threaded to receive threaded member 69' extending into a threaded opening in control member 60'. It should be noted that in assembly, the threaded member 69' is threaded into control member 60' projecting into the chamber 64' so that the control member is normally spaced from the interior face of boss 65'. In this form of construction the threaded member is carried solely by the boss 65'. As the maximum angular movement of control member 60' is limited, the lever member 60' cannot become dislodged from the threaded member 69'.

It should also be noted that in both forms of the construction, the limited angular movement of the control member about the axis of the threaded fulcrum member results in only slight lateral displacement of the control member, so that it does not engage any surfaces of the adjacent boss portions. Thus my arrangement eliminates all anti rattle springs or devices, as well as to reduce to a minimum the number of machining operations necessary in mounting a control member, thus minimizing the cost of manufacture and assembly and at the same time provide a simple and satisfactory lever mounting.

It is apparent that, within the scope of the invention, modifications and different arrangements may be made other than is herein disclosed, and the present disclosure is illustrative merely, the invention comprehending all variations thereof.

What I claim is:

1. Means for pivotally mounting intermediate its handle and motion-transmitting ends a control lever for mechanism occupying a housing having a hollow neck through which the motion-transmitting end of said lever extends into operative relation with said mechanism, said means including a side wall of said neck which is formed with a transversely-extending, threaded opening and said lever being formed with an aligned threaded opening, and a fulcrum element having a threaded shank and a head by which said shank may be turned, said shank being threaded through the aligned threaded openings in said side wall and lever to an extent determined by said head and said side wall and providing a fixed support upon which said lever may be rocked, the threads in the opening through said lever and the threads on said shank cooperating to permit limited angular movement of said lever on said shank while holding said lever in predetermined spaced relation with respect to the side walls of said neck.

2. Means for pivotally mounting intermediate its handle and motion-transmitting ends a control lever for mechanism occupying a housing having a hollow neck through which the motion-transmitting end of said lever extends into operative relation with said mechanism, said means including a side wall of said neck which is formed with a transversely-extending, threaded opening and said lever being formed with an aligned threaded opening, and a fulcrum element having a threaded shank and a head by which said shank may be turned, said shank being threaded through the aligned threaded openings in said side wall and lever to an extent determined by said head and said side wall and providing a fixed support in said neck in the form of a cantilever and upon which said lever may be rocked, the threads in the opening through said lever and the threads on said shank cooperating to permit limited angular movement of said lever on said shank while holding said lever in predetermined spaced relation with respect to the side walls of said neck, said fulcrum element and lever being carried solely by said side wall.

3. Means for pivotally mounting intermediate its handle and motion-transmitting ends a control lever for mechanism occupying a housing having a hollow neck through which the motion-transmitting end of said lever extends into operative relation with said mechanism, the motion-transmitting end of said lever having a forked extension which is movable into cooperating relation with a control element of said mechanism by movement of said end into said neck, said means including a side wall of said neck which is formed with a transversely-extending, threaded opening and said lever being formed with an aligned threaded opening, and a fulcrum element having a threaded shank and a head by which said shank may be turned, said shank being threaded through the aligned threaded openings in said lever and said side wall to provide a fixed support upon which said lever may be rocked and which maintains said forked extension in cooperating relation with said control element, the threads in the opening through said lever and the threads on said shank cooperating to permit limited angular movement of said lever on said shank while holding said lever in predetermined spaced relation with respect to the side walls of said neck.

WALTER F. BENNING.

REFERENCES CITED

The following references are of record in the file of this patent:

UNITED STATES PATENTS

| Number | Name | Date |
| --- | --- | --- |
| 353,274 | Tucker et al. | Nov. 23, 1886 |
| 382,715 | Mather | May 15, 1888 |
| 901,339 | Grant | Oct. 20, 1908 |
| 1,588,013 | Dallmann | June 8, 1926 |
| 1,589,434 | Schoenrock | June 22, 1926 |
| 1,802,233 | Burford | Apr. 21, 1931 |
| 1,958,968 | Leighton | May 15, 1934 |
| 2,002,781 | Leighton | May 28, 1935 |
| 2,003,634 | Leighton | June 4, 1935 |
| 2,039,912 | Leighton | May 5, 1936 |
| 2,092,232 | Walton | Sept. 7, 1937 |
| 2,123,006 | Hayes | July 5, 1938 |
| 2,282,962 | Hawkins et al. | May 12, 1942 |